UNITED STATES PATENT OFFICE.

JOHN ARMSTRONG, OF LONDON, ENGLAND, ASSIGNOR OF ONE-HALF TO PATENT CORPORATION LIMITED, OF LIVERPOOL, ENGLAND.

ALKALI-PACKAGE.

1,342,148.     Specification of Letters Patent.     Patented June 1, 1920.

No Drawing.     Application filed April 18, 1918. Serial No. 229,376.

*To all whom it may concern:*

Be it known that I, JOHN ARMSTRONG, a subject of the King of Great Britain, residing at London, in the county of Middlesex, in the Kingdom of England, have invented certain new and useful Improvements in Alkali-Packages, of which the following is a specification.

This invention relates to a new and useful article of manufacture, and its object is to provide a material which can be easily handled, packed in boxes or bags or stored, without deterioration, and yet be immediately ready for use as a caustic alkali.

It is well known that caustic alkali is hygroscopic, that is when left exposed to the atmosphere it rapidly absorbs moisture and to a certain extent carbonic acid also, thus deteriorating and becoming unfit for general use. It has therefore to be stored in expensive air-tight iron drums.

The manufacture of my product is extremely simple.

It consists in mixing a dry powdered alkaline carbonate with a dry powdered caustic or hydrated alkaline earth, more especially lime or baryta. I prefer lime to other alkaline earth as the other alkaline earths have greater combining equivalents and are not as active and there is no advantage in any of the others; in my experience they are much too expensive. This mixture prepared according to the following method may be stored without deterioration, and be ready at any time for use, and liberates at once caustic liquid alkali by the addition of water, whereby the caustic alkali is obtained in solution, and the alkaline earth falls as an insoluble precipitated carbonate, the caustic lime or caustic baryta in the presence of water taking up the carbonic acid of the alkali, and setting the liquid caustic alkali free.

In carrying out my invention, I take calcium oxid, (burnt lime stone) or calcium hydrate dry slacked lime, and if the latter take care that it is dry, and add it to finely powdered carbonate of sodium or of potassium in molecular proportions such as $Na_2CO_3 + CaO$ or preferably $+CaH_2O_2$.

These materials are then thoroughly mixed and packed in paper bags or other containers which if they are to be sent into damp climates should be waterproofed by being varnished or the like.

In thus describing my invention I am well aware that for a long time past in alkali works alkali has been manufactured by treating a solution of carbonated alkali with caustic lime, the result being a solution of caustic alkali and precipitated carbonate of lime ($CaCO_3$), but my invention differs from this in that the two materials are mixed dry and are used in that state as an article of commerce, as in that state they have no hygroscopic power or causticity, and therefore can remain for years in reasonably dry air without injury, and can at once be mixed and used by any person.

I would also mention that it is not absolutely necessary to mix the two materials together, as they can be each made up into pilules, cubes, or small packages in chemical equivalent proportions, and then sold in this state, just as material for aerated waters have frequently been sold in the form of a package of tartaric or citric acid and a package of carbonate of sodium, potassium or lithium in the best proportions, to produce an aerated drink with water.

I declare that what I claim is:—

1. As a new article of manufacture desiccated alkaline earth oxid or hydrate as described and dry alkali-metal carbonate put up together in packages in molecular proportions to form with water calcium carbonate and caustic alkali.

2. As a new article of manufacture a desiccated alkaline earth and desiccated alkali-metal carbonate each made up in chemically equivalent proportions to form when mixed with water alkaline earth carbonate and caustic alkali solution.

In witness whereof, I have hereunto signed my name this 21st day of March, 1918, in the presence of two subscribing witnesses.

JOHN ARMSTRONG.

Witnesses:
     LLEWELYN JONES,
     MYLES HAILES.